United States Patent
McDonald et al.

(10) Patent No.: US 10,437,591 B2
(45) Date of Patent: Oct. 8, 2019

(54) EXECUTING AN OPERATING SYSTEM ON PROCESSORS HAVING DIFFERENT INSTRUCTION SET ARCHITECTURES

(71) Applicant: Qualcomm Incorporated, San Diego, CA (US)

(72) Inventors: Michael R. McDonald, Chandler, AZ (US); Erich J. Plondke, Austin, TX (US); Pavel Potoplyak, Austin, TX (US); Lucian Codrescu, Austin, TX (US); Richard Kuo, Austin, TX (US); Bryan C. Bayerdorffer, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1283 days.

(21) Appl. No.: 13/777,314

(22) Filed: Feb. 26, 2013

(65) Prior Publication Data

US 2014/0244983 A1    Aug. 28, 2014

(51) Int. Cl.
| | |
|---|---|
| *G06F 9/38* | (2018.01) |
| *G06F 9/30* | (2018.01) |
| *G06F 9/50* | (2006.01) |
| *G06F 9/455* | (2018.01) |
| *G06F 9/48* | (2006.01) |

(52) U.S. Cl.
CPC .............. *G06F 9/3005* (2013.01); *G06F 9/38* (2013.01); *G06F 9/4552* (2013.01); *G06F 9/4881* (2013.01); *G06F 9/505* (2013.01); *G06F 9/5044* (2013.01); *G06F 9/5088* (2013.01); *G06F 2209/509* (2013.01)

(58) Field of Classification Search
CPC ........... G06F 9/3877; G06F 2009/3883; G06F 9/4843
See application file for complete search history.

(56) References Cited

U.S. PATENT DOCUMENTS

| | | | |
|---|---|---|---|
| 6,286,092 | B1 | 9/2001 | Frank et al. |
| 6,732,250 | B2 | 5/2004 | Durrant |
| 6,981,072 | B2 | 12/2005 | Day et al. |
| 7,299,337 | B2 | 11/2007 | Traut et al. |

(Continued)

FOREIGN PATENT DOCUMENTS

| | | |
|---|---|---|
| CN | 101517536 A | 8/2009 |
| CN | 101739235 A | 6/2010 |

(Continued)

OTHER PUBLICATIONS

Lipasti et al. "Modern Processor Design: Fundamentals of Superscalar Processors" McGraw-Hill, 2005, pp. 136-153 (Year: 2005).*

(Continued)

*Primary Examiner* — Jacob Petranek
(74) *Attorney, Agent, or Firm* — Qualcomm Incorporated-Tol (57) ABSTRACT

An apparatus includes a first processor having a first instruction set and a second processor having a second instruction set that is different than the first instruction set. The apparatus also includes a memory storing at least a portion of an operating system. The operating system is concurrently executable on the first processor and the second processor.

32 Claims, 5 Drawing Sheets

(56) References Cited

U.S. PATENT DOCUMENTS

| | | | |
|---|---|---|---|
| 7,685,409 B2 | 3/2010 | Du et al. | |
| 7,739,476 B2 | 6/2010 | Pan et al. | |
| 7,962,909 B1 | 6/2011 | Klaiber | |
| 8,250,254 B2 | 8/2012 | Saripalli | |
| 8,296,743 B2 | 10/2012 | Linderman et al. | |
| 8,312,230 B2 | 11/2012 | Jacobs et al. | |
| 8,468,532 B2* | 6/2013 | Aguilar, Jr. | G06F 9/4881 718/103 |
| 2002/0138679 A1 | 9/2002 | Koning et al. | |
| 2004/0139442 A1 | 7/2004 | Miyamoto | |
| 2005/0251806 A1 | 11/2005 | Auslander et al. | |
| 2006/0005188 A1 | 1/2006 | Vega et al. | |
| 2007/0169127 A1 | 7/2007 | Kashyap | |
| 2008/0244599 A1 | 10/2008 | Hodson et al. | |
| 2009/0109230 A1 | 4/2009 | Miller et al. | |
| 2009/0217276 A1 | 8/2009 | Brenner et al. | |
| 2009/0282198 A1 | 11/2009 | Hamoudi et al. | |
| 2010/0107249 A1 | 4/2010 | Krig | |
| 2010/0125708 A1 | 5/2010 | Hall et al. | |
| 2010/0153945 A1 | 6/2010 | Bansal et al. | |
| 2010/0242014 A1 | 9/2010 | Zhu | |
| 2010/0325454 A1 | 12/2010 | Parthasarathy | |
| 2011/0010716 A1* | 1/2011 | Raghuraman | G06F 9/54 718/102 |
| 2011/0072428 A1 | 3/2011 | Day, II et al. | |
| 2011/0296406 A1 | 12/2011 | Bhandari et al. | |
| 2012/0072638 A1 | 3/2012 | Grubb et al. | |
| 2012/0240112 A1 | 9/2012 | Nishiguchi et al. | |
| 2012/0272015 A1 | 10/2012 | Fahrig | |
| 2012/0291033 A1 | 11/2012 | De Justo Teixeira et al. | |
| 2013/0013889 A1 | 1/2013 | Devaraj et al. | |
| 2013/0036323 A1 | 2/2013 | Goose et al. | |
| 2013/0055252 A1 | 2/2013 | Lagar-Cavilla et al. | |
| 2014/0053272 A1 | 2/2014 | Lukacs et al. | |
| 2014/0101405 A1* | 4/2014 | Papadopoulou | G06F 12/1027 711/207 |
| 2014/0281332 A1 | 9/2014 | Koob et al. | |
| 2014/0282507 A1 | 9/2014 | Plondke et al. | |
| 2014/0282508 A1 | 9/2014 | Plondke et al. | |

FOREIGN PATENT DOCUMENTS

| | | |
|---|---|---|
| CN | 102103567 A | 6/2011 |
| CN | 102741828 A | 10/2012 |
| EP | 2498183 A2 | 9/2012 |
| JP | S62286155 A | 12/1987 |
| JP | 2007328415 A | 12/2007 |
| WO | 0137088 A2 | 5/2001 |
| WO | 2005029326 A1 | 3/2005 |
| WO | 2008054619 A2 | 5/2008 |
| WO | 2012005949 A2 | 1/2012 |
| WO | 2012023150 A2 | 2/2012 |
| WO | 2012028214 A1 | 3/2012 |
| WO | 2012105174 A1 | 8/2012 |
| WO | 2012141677 A1 | 10/2012 |

OTHER PUBLICATIONS

International Search Report and Written Opinion for International Application No. PCT/US2014/016391, ISA/EPO, dated Aug. 29, 2014, 17 pages.

Communication Relating to the Results of the Partial International Search for International Application No. PCT/US2014/016391, ISA/EPO, dated Jul. 1, 2014, 7 pages.

Tadokoro et al. "A Secure System-wide Process Scheduler across Virtual Machines," 2010 IEEE 16th Pacific Rim International Symposium on Dependable Computing (PRDC), DOI: 10.1109/PRDC.2010.34, Publication Year: 2010 , pp. 27-36.

Benkner S., et al., "Peppher: Efficient and Productive Usage of Hybrid Computing Systems" IEEE Micro, IEEE Service Center, Los Alamitos, CA, US, vol. 31, No. 5, Sep. 5, 2011 (Sep. 5, 2011), pp. 28-41, XP011363084, ISSN: 0272-1732, DOI: 10.1109/MM.2011.67.

European Search Report—EP19156727—Search Authority—The Hague—Jul. 11, 2019.

Wernsing J R., et al., "Elastic computing: A portable optimization framework for hybrid computers", Parallel Computing, vol. 38, No. 8, May 16, 2012 (May 16, 2012), pp. 438-464, XP028496007, ISSN: 0167-8191, DOI: 10.1016/J.PARCO.2012.05.001, [retrieved on May 16, 2012].

* cited by examiner

EXECUTING AN OPERATING SYSTEM ON PROCESSORS HAVING DIFFERENT INSTRUCTION SET ARCHITECTURES

I. FIELD

The present disclosure is generally related to execution of operating systems at multi-processor devices.

II. BACKGROUND

Advances in technology have resulted in smaller and more powerful computing devices. For example, there currently exist a variety of portable personal computing devices, including wireless computing devices, such as portable wireless telephones, personal digital assistants (PDAs), tablet computers, and paging devices that are small, lightweight, and easily carried by users. Many such computing devices include other devices that are incorporated therein. For example, a wireless telephone can also include a digital still camera, a digital video camera, a digital recorder, and an audio file player. Also, such computing devices can process executable instructions, including software applications, such as a web browser application that can be used to access the Internet and multimedia applications that utilize a still or video camera and provide multimedia playback functionality. As such, these devices can perform functions typically performed by larger devices, such as desktop computers.

Some electronic devices may include multiple processors. For example, a mobile phone may include a central processing unit (CPU) (sometimes referred to as an application processor) and a digital signal processor (DSP). Each processor may be better suited than the other processor(s) to perform certain computation tasks. For example, the CPU, which may act as the primary processor and may execute a mobile phone operating system, may be more efficient in executing "control code," such as web browser and spreadsheet code. On the other hand, the DSP may be more efficient than the CPU when executing signal processing and other math-intensive functions.

Different processors may be optimized for different workloads and may have different architectures (e.g., instruction sets). For example, a phone may include a CPU implemented according to a first architecture and a DSP implemented according to a second architecture. Because the different processors have different architectures, each processor may execute its own operating system. Even if the same operating system is executed on the processors, each processor functions as a separate machine executing its own operating system instance. Due to the differences in architecture, the two operating system instances may be unable to share data and offload processing tasks to one another. Additionally, memory is allocated from each environment, rather than from a shared pool.

As mobile applications become more complex, certain applications, or threads thereof, may be better suited for CPU execution or DSP execution. However, because the CPU and DSP execute different operating systems, the phone may be forced to execute an application (and each thread thereof) on only the CPU or only the DSP. As a result, mobile applications are conventionally developed for CPUs and do not attempt to leverage the processing capabilities of other available processors, such as DSPs.

In the personal computing area, some software vendors have attempted to address the use of different architectures in different computers by providing "universal" binaries (also referred to as "fat" binaries). Generally, a universal binary includes a different version of the same software for each of multiple architectures. During installation or execution of the universal binary at a particular computer, the appropriate version of the software is identified and installed or executed based on the architecture of the particular computer. However, because only a single architecture is present on each computer, universal binaries do not offer a way to concurrently execute the same software instance using processors having different architectures. In addition, it may be difficult to implement and process data structures that are to be shared between the processors.

III. SUMMARY

Systems and methods of concurrently executing the same instance of software (e.g., an operating system) on multiple processors having different architectures are disclosed. For example, based on the present disclosure, graphics and user interface (U/I) threads of a game may be executed on a CPU of a mobile phone while a multimedia processing thread of the game is executed on a DSP of the mobile phone, even though the CPU and the DSP have different instruction set architectures. In accordance with the described techniques, CPU code and DSP code may appear to exist as if on a symmetric multiprocessing (SMP) machine. Thus, data structures and communication primitives may be shared and multi-threading across disparate architectures may be utilized.

According to a first implementation, multiple versions of operating system functions (e.g., kernel code) may be provided within a single operating system instance that has access to multiple processors. For example, the operating system may have access to a first version and a second version of each of one or more functions, where the first version is implemented using the instruction set of the CPU and the second version is implemented using the instruction set of the DSP. It will be appreciated that because both versions of the functions will be available at runtime, application developers may be provided the opportunity to design applications (and individual threads or portions thereof) for execution on one or more of the available architectures.

In addition, a scheduler of the operating system may be configured to determine whether particular code is intended to be (or should be) executed by the CPU or by the DSP. Memory (e.g., virtual and/or physical address space) and kernel data structures may be shared by the processors and code executed thereon. In one implementation, a DSP request to the operating system may be passed to the CPU and then processing results may be sent back to the DSP, or vice versa. Moreover, different parts of the same task (i.e., software thread) may be performed by different processors.

According to a second implementation, DSP code may run a "remoted" operating system environment. Operating system events (e.g., page faults, exceptions, systems requests, traps, etc.) occurring at the DSP may be handled by the CPU. Thus, even though a task appears to run in a DSP environment, operating system requests may actually be handled by the CPU environment.

In a particular embodiment, a method includes executing first code on a first processor (e.g., a DSP). The method also includes, while executing the first code, executing an operating system event. The method further includes, upon executing the operating system event, halting execution of the first code and initiating execution of second code on a second processor (e.g., a CPU), the second code to handle the operating system event. The method includes, upon completion of execution of the second code handling the operating system event, halting the second code and resuming execution of the first code on the first processor (e.g., the DSP).

In another particular embodiment, an apparatus includes a first processor having a first instruction set. The apparatus also includes a second processor having a second instruction set, the second instruction set being different than the first instruction set. The apparatus further includes a memory storing at least a portion of an operating system that is concurrently executable on the first processor and the second processor.

In another particular embodiment, a method includes receiving, at a scheduler of an operating system, a request to schedule a task for execution. The operating system is concurrently executable on a first processor having a first architecture and a second processor having a second architecture. The method also includes in response to determining that the task is available for execution using the first architecture on the first processor and using the second architecture on the second processor, scheduling the task on the first processor based on at least one selection criterion. The method further includes, during execution of the task, switching execution of the task from the first processor to the second processor.

In another particular embodiment, an apparatus includes first means for processing instructions associated with a first instruction set. The apparatus also includes second means for processing instructions associated with a second instruction set. The apparatus further includes means for storing at least a portion of an operating system, the operating system concurrently executable on the first means for processing and the second means for processing.

In another particular embodiment, a non-transitory computer-readable medium includes a single instance of an operating system. The single instance of the operating system includes instructions that, when executed at an electronic device including a first processor and a second processor, cause concurrent execution of the operating system on the first processor and the second processor. The first processor is associated with a first instruction set architecture and the second processor is associated with a second instruction set architecture that is different than the first instruction set architecture.

In another particular embodiment, an apparatus includes a memory accessible to a first processor that is associated with a first instruction set architecture and to a second processor that is associated with a second instruction set architecture. The memory stores at least one data structure. The data structure includes a first location identifier of a first function compiled to execute on the first instruction set architecture. The data structure also includes a second location identifier of a second function compiled to execute on the second instruction set architecture.

One particular advantage provided by at least one of the disclosed embodiments is an ability to concurrently execute a single instance of an operating system, and applications/threads associated with the operating system, on multiple processors having disparate architectures. For example, operating system code and/or application code may be scheduled for execution on a particular processor of multiple available processors based on selection criteria (e.g., which processor is least loaded, is best suited to execute that type of code, etc.) Another advantage provided by at least one of the disclosed embodiments is an ability for application developers to develop applications that can leverage computing capabilities of processors that are traditionally not used for third party applications (e.g., DSPs). Other aspects, advantages, and features of the present disclosure will become apparent after review of the entire application, including the following sections: Brief Description of the Drawings, Detailed Description, and the Claims.

V. DETAILED DESCRIPTION

Figure 1:
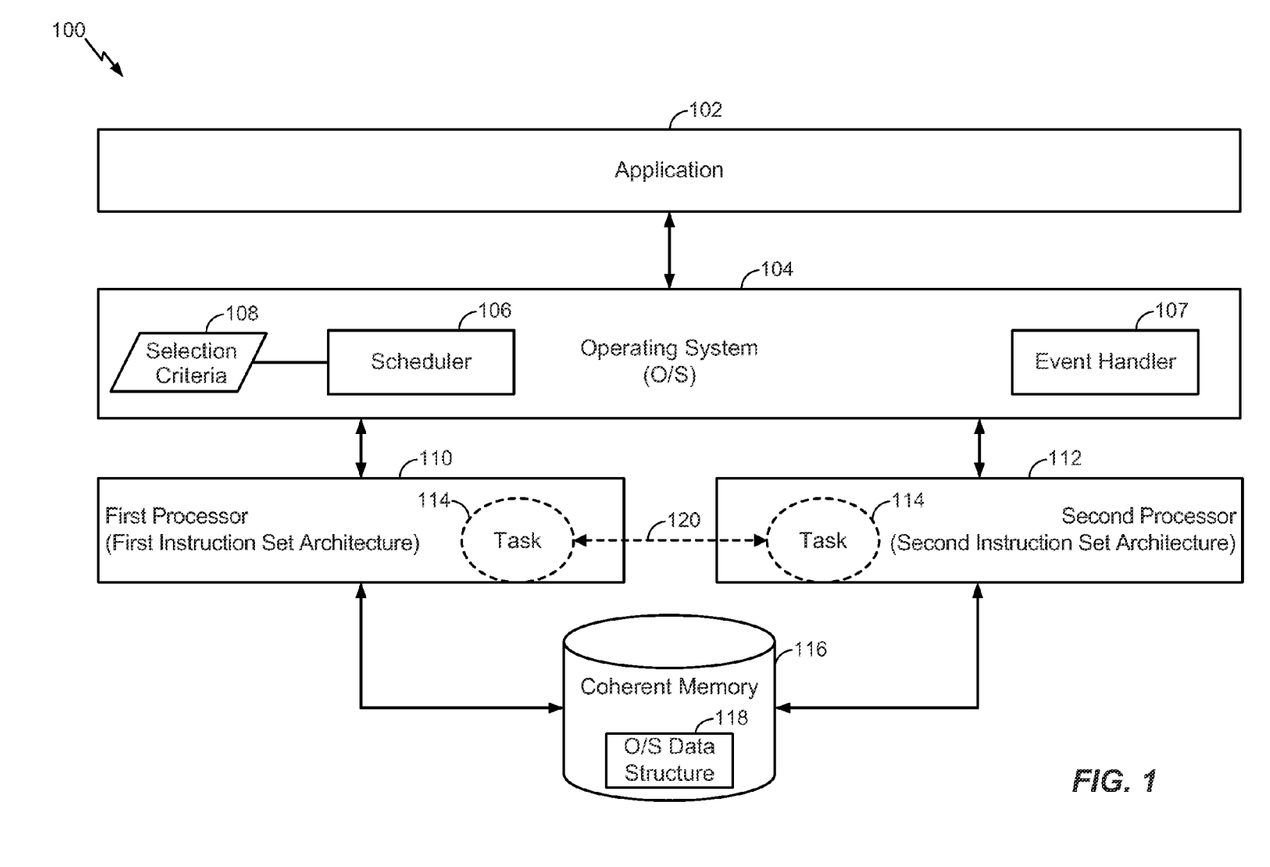
FIG. 1 is a diagram to illustrate a particular embodiment of a system that is operable to support execution of a single instance of an operating system on multiple processors having different architectures.

FIG. 1 is a diagram of an illustrative embodiment of a system 100 that is operable to support concurrent execution of a single instance of an operating system on multiple processors having different architectures (alternately referred to as "instruction set architectures (ISAs)" or "instruction sets"). For example, in the system 100 of FIG. 1, an operating system (O/S) 104 and components/applications associated therewith may be concurrently executed on a first processor 110 having a first ISA and a second processor 112 having a second ISA. It should be noted that although two processors are shown in FIG. 1, this is for illustration only. The techniques described herein may be used in systems that include more than two processors.

In a particular embodiment, at least one of the processors 110, 112 may be a central processing unit (CPU), such as a CPU that is configured to execute instructions associated with a CPU instruction set. For example, the CPU may have multiple execution cores (e.g., a dual-core CPU, a quad-core CPU, etc.). In multi-processor electronic devices (e.g., mobile computing devices, such as mobile phones), the CPU may be responsible for and/or better-suited for executing control code, such as input/output (I/O) code, user interface (U/I) code, browser code, spreadsheet code, etc. For example, when the mobile phone executes a game that includes both U/I tasks (or threads) and multimedia processing tasks (or threads), the CPU may perform more efficiently when executing the U/I tasks than when executing the multimedia processing tasks.

In a particular embodiment, at least one of the processors 110, 112 may be a digital signal processor (DSP), such as a processor that is configured to execute instructions associated with a DSP instruction set. For example, the DSP may have multiple hardware threads and may support dynamic interleaved multithreading and real-time processing. In multi-processor electronic devices (e.g., mobile phones), the DSP may be responsible for and/or better-suited for executing wireless signal processing functions and math-intensive code. For example, when the mobile phone executes a game that includes both U/I tasks (or threads) and multimedia processing tasks (or threads), the DSP may perform more efficiently when executing the multimedia processing tasks than when executing the U/I tasks.

It should be noted that various processor combinations may be used in conjunction with the described techniques. In one example, the system 100 may include multiple processors that are of the same type but that have different instruction sets. To illustrate, both of the processors 110, 112 may be CPUs but the ISAs of the CPUs may be different. Alternately, both of the processors 110, 112 may be DSPs but the ISAs of the DSPs may be different. In another example, one of the processors 110, 112 may be a CPU and the other of the processors 110, 112 may be a DSP. Processors other than CPUs and DSPs may also be present in the system 100. Other types or processors may include, but are not limited to, network processing units (NPUs), graphical processing units (GPUs), etc. It should also be noted that although the description herein refers to CPU-type architectures and DSP-type architectures, this is for example only. Various architectures/instruction sets may be used in conjunction with the described techniques. Different architectures may support different functions, different opcodes, different types and numbers of arguments for common functions, etc.

The system 100 may include data storage capability. Data storage may include volatile memory (e.g., random access memory (RAM), register-based memory, or cached-based memory) and/or non-volatile memory (e.g., hard disks). In the embodiment of FIG. 1, the system 100 includes a memory 116. As further described herein, the memory 116 may be a "coherent" memory that stores at least one operating system data structure 118 to support concurrent execution of the operating system 104 across the processors 110, 112. For example, the operating system data structure 118 may include locks, scheduling queues, and a table of function pointers, as further described with reference to FIG. 2.

The operating system 104 may generally be operable to perform system level (e.g., kernel level) functions at the system 100. For example, the operating system 104 may perform blocking/unblocking and may provide abstractions for and multiplexed access to hardware resources (e.g., the processors 110, 112 and the memory 116). In addition to providing system level functionality, the operating system 104 may support execution of one or more applications (e.g., user mode applications). For example, an application 102 may be a third party application installed at the system 100 by a user or an administrator.

The operating system 104 may include one or more modules or logical blocks to perform operating system functions. For example, the operating system 104 may include a scheduler 106 and an event handler 107. The scheduler 106 may be configured to schedule execution of tasks at the processors 110, 112, and the event handler 107 may be configured to handle (e.g., respond to) operating system events. In a particular embodiment, the operating system 104 may include a safeguard or control that prevents either of the processors 110, 112 from modifying an operating system state (e.g., data in the memory 116) that is being used, or that may be relied on, by the other of the processors 110, 112.

In response to receiving a request (e.g., from the operating system 104 or the application 102) to execute a particular task 114, the scheduler 106 may determine whether the particular task 114 supports (e.g., is available for execution using) the first instruction set of the first processor 110, the second instruction set of the second processor 112, or both. In a particular embodiment, determining whether a task supports a particular instruction set includes determining whether the system 100 has access to code corresponding to the task (and any associated sub-routines, operating system calls, etc.) that is represented using instructions of the particular instruction set. When the scheduler 106 determines that the requested task 114 supports only one of the instruction sets, the scheduler 106 may schedule the requested task 114 for execution on the corresponding supported processor 110 or 112.

When the scheduler 106 determines that the requested task 114 supports multiple instruction sets/multiple processors, the scheduler 106 may select a particular processor on which to schedule the task 114 for execution. Upon selecting a particular processor 110, 112 on which to schedule the task 114, the scheduler 106 may provide a system call to start the task using the corresponding instruction set.

In a particular embodiment, the scheduler 106 may use selection criteria 108 in selecting the particular processor. The selection criteria 108 may include an identification of a least loaded processor. For example, the scheduler 106 may select a least loaded of the processors 110, 112 on which to schedule the task 114 to achieve load balancing. Alternately, or in addition, the selection criteria 108 may include a type of a task. For example, the scheduler 106 may schedule a U/I task on a CPU and may schedule math-intensive tasks on a DSP. Alternately, or in addition, the selection criteria 108 may include identification of a lowest power usage associated with the task 114. For example, the scheduler 106 may schedule the task 114 on the processor 110 or 112 that will consume the least amount of power while executing the task 114, thereby decreasing overall power consumption at the system 100. Other selection criteria may also be used by the scheduler 106.

In a particular embodiment, when the task 114 supports both the first instruction set of the first processor 110 and the second instruction set of the second processor 112, the scheduler 106 may be configured to switch execution of the task from one of the processors 110, 112 to the other. Moreover, such dynamic switching may be performed during execution of the task 114 and transparently with respect to higher level components of the system (e.g., the application 102). For example, the task 114 may be "migrated" (e.g., using a system call) from the first processor 110 to the second processor 112, or vice versa, as shown at 120. Such migration may be made possible at least in part by the first processor 110 and the second processor 112 having access to the same coherent memory 116 and operating system data structure(s) 118 stored thereon. It will be appreciated that the ability to dynamically migrate tasks that support multiple instruction sets may free up processing resources for tasks that only support one instruction set.

It should be noted that although the foregoing describes scheduling and migration of a task, scheduling and migration of sub-tasks may also be performed at the system 100 of FIG. 1. For example, an I/O task/thread, a multimedia processing task/thread, and a graphics task/thread of a game may be concurrently scheduled and executed at a CPU, a DSP, and a GPU, respectively. Scheduling tasks on appropriate processors may increase efficiency and decrease power consumption at the system 100 of FIG. 1. Thus, when the system 100 is integrated into a battery-powered device, such as a mobile phone, the system 100 may result in increased performance and battery life. For example, a user may be able to the play the game longer on his or her mobile phone without needing to charge the mobile phone than if the game ran solely on the CPU.

During operation, the operating system 104, tasks thereof (e.g., the task 114), and/or applications associated therewith (e.g., the application 102) may be executed on one or more both of the processors 110, 112, even though the processors 110, 112 have different architectures. For example, according to a first embodiment of operation at the system 100 of FIG. 1, one of the processors 110, 112 may be a "primary" processor and the other processor may be a "secondary" processor. In such an embodiment, a request from the secondary processor to the operating system may be passed to the primary processor, and processing results may be sent back to the secondary processor.

To illustrate, the primary processor may be a CPU and the secondary processor may be a DSP. The DSP may execute a "remoted" operating system environment. During execution of first code (e.g., DSP-specific code), the DSP may detect and/or execute an operating system event. An operating system event may be an event that causes flow of execution to switch from a user mode of an operating system to a kernel mode of the operating system. Examples of operating system events include, but are not limited to, page faults, traps, system faults, system requests (e.g., associated with synchronization objects, such as mutexes or semaphores), hardware errors (e.g., bus errors), address errors, permissions violations, etc. The DSP may rely on the CPU to handle operating system events. For example, upon executing the operating system event, the DSP may halt execution of the first code and may initiate execution of second code on the CPU, where the second code is configured to handle the operating system event. In a particular embodiment, initiation of the event handling code at the CPU is performed using inter-processor messaging, by the scheduler 106, using the coherent memory 116, using an application programming interface (API), or any combination thereof. Thus, each of the processors 110, 112 may be configured to communicate with the other of the processors 110, 112 while executing code and/or while halted. The event handling code at the CPU may handle the operating system event and may provide any execution results to the DSP. Upon completion of the event handling, the event handler may be halted at the CPU and the DSP code may be resumed at the DSP.

According to a second embodiment of operation at the system 100 of FIG. 1, the operating system 104 may include multiple versions of operating system routines, modules, and functions. For example, when the first processor 110 is a CPU and the second processor 112 is a DSP, the single instance of the operating system 104 may include at least two versions of one or more routines, modules, and functions-a first version that is represented in instructions of the CPU's ISA and a second version that is represented in instructions of the DSP's ISA. In such an embodiment, the scheduler 106 may be free to schedule the application 102 (or components thereof) on either of the processors 110 or 112, because the operating system 104 has the ability to respond to operating system calls made by the application 102 using either processor.

The system 100 of FIG. 1 may thus enable concurrent execution of the operating system 104, components thereof, and applications associated therewith on multiple processors having different architectures. This may increase efficiency and decrease power consumption at the system 100 of FIG. 1. The system 100 of FIG. 1 may also enable application developers to develop applications that leverage capabilities of processors that are not traditionally used for third party applications (e.g., DSPs). This may make the system 100 of FIG. 1 more attractive to application developers than systems that do not support dynamic application scheduling and data sharing across processors having different architectures.

Figure 2:
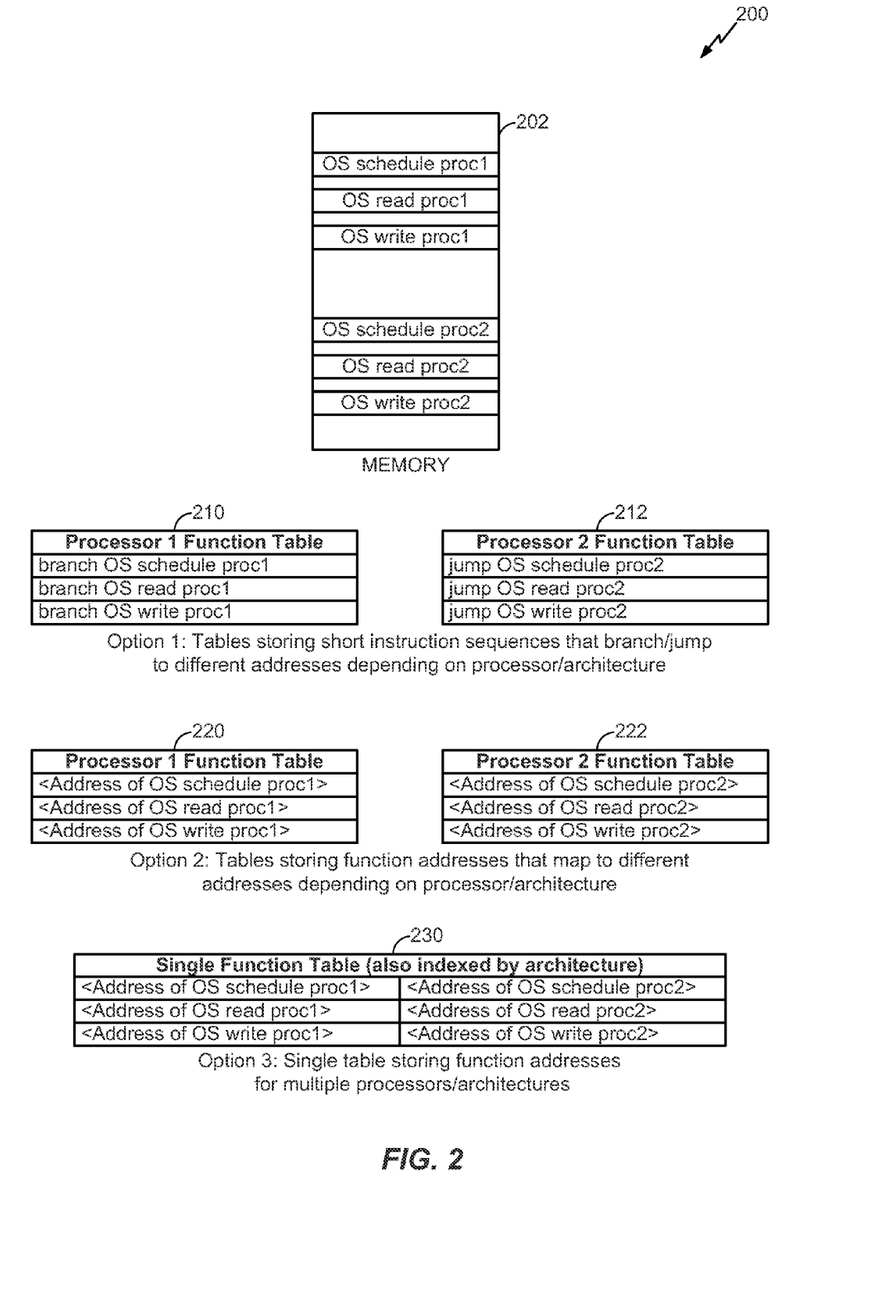
FIG. 2 is a diagram to illustrate a particular embodiment of the operating system data structure of FIG. 1.

FIG. 2 is a diagram to illustrate particular embodiments of function tables that may be stored in the operating system data structure 118 of FIG. 1, and is generally designated 200. As described with reference to the operating system data structure 118 of FIG. 1, the tables of FIG. 2 may be used to identify a "correct" version of a function (that is, the version of the function that matches the instruction set for the processor attempting to execute the function) that is available in multiple instruction sets.

One difficulty in running a common operating system with shared data structures may be processing data structures that contain the addresses of functions. For example, when a first processor having a first instruction set and a second processor having a second instruction set have a common operating system, functions implemented in both the first instruction set and the second instruction set may need to be available. However, the functions may appear at different addresses. Thus, data structures that store the address of a function (e.g., a "function pointer") need to be able to refer to the "correct" function for a particular processor/instruction set, whose address may differ depending on the instruction set of the processor.

In accordance with the described techniques, the difficulty in processing such data structures may be reduced by using a level of indirection. For example, a memory may store shared data structure(s) that are accessible to multiple processors having different instruction set architectures. The data structure(s) may include a first location identifier of a first function compiled to execute on the first instruction set architecture and a second location identifier of a second function compiled to execute on the second instruction set architecture. The location identifiers may be instructions, offsets, virtual addresses, etc., as further described herein. Moreover, the first function and the second function may be different versions of the same operating system function. By introducing the level of indirection, the described techniques may advantageously enable execution of the same high-level (e.g., application-level) code on multiple architectures. For example, the code may include a call to an operating system function "X." When executed on a first processor associated with a first architecture, the call to "X" may be mapped to a first implementation of "X" that is specific to the first architecture and that is located at a first physical address in memory. When executed on a second processor associated with a second architecture, the same call to "X" may be mapped to a second implementation of "X" that is specific to the second architecture and that is located at a second physical address in the memory.

Three embodiments of implementing such "architecture-independent" code execution are described herein. In FIG. 2, three operating system functions are shown—an "OS schedule" function, and "OS read" function, and an "OS write" function. A first version ("proc1") of each of the functions and a second version ("proc2") of each of the functions are available at different locations in a memory 202.

In a first embodiment (designated "Option 1" in FIG. 2), tables 210, 212 may include short (e.g., constant length) instruction sequences that redirect execution to the "correct" function. The first table 210 may be mapped to a particular virtual address on the first processor and the second table 212 may be mapped to the same virtual address on the second processor. However, the tables 210, 212 may lead to (e.g., branch or jump to) different physical addresses depending on the processor architecture. A virtual address to physical address translation for each processor may enable the "correct" table to be mapped at the same virtual address. Indirect references to the function point to the table entry, rather than the actual function.

For example, as shown in FIG. 2, Processor 1 may support a "branch" instruction and Processor 2 may support a "jump" instruction. The table 210 for Processor 1 may include branch instruction sequences for first versions of the "OS schedule" function, the "OS read" function, and the "OS write" function. The table 212 for Processor 2 may include jump instruction sequences for second versions of the "OS schedule" function, the "OS read" function, and the "OS write" function. A call to the function "OS schedule" in high-level code may point to the first entry of a table that is stored at a particular virtual address. From the perspective of the high-level code, the same virtual address is used for the function mapping table, regardless of which processor is executing the high-level code. When the high-level code is executed on Processor 1, the table 210 may be accessed and a branch to the "proc1" version of the "OS schedule" function may be performed. That is, when the high-level code is executed on Processor 1, the table 210 may be "chosen" instead of the table 212, because, for Processor 1, the virtual address for the function mapping table in the high-level code maps (e.g., via a virtual-to-physical address mapping table specific to Processor 1) to the physical address of the table 210. When the high-level code is executed on Processor 2, the table 212 may be accessed and a jump to the "proc2" version of the "OS schedule" function may be performed. That is, when the high-level code is executed on Processor 2, the table 212 may be "chosen" instead of the table 210, because, for Processor 2, the virtual address for the function mapping table in the high-level code maps (e.g., via a virtual-to-physical address mapping table specific to Processor 2) to the physical address of the table 212. Thus, the first embodiment may be similar to a "procedure linkage table" for position-independent code.

In a second embodiment (designated "Option 2" in FIG. 2), tables 220, 222 may include the addresses for each function. Instead of storing the address to a function directly, data structures (e.g., used by high-level code) may contain the address or index in the tables 220, 222. The tables 220, 222 may contain the address of the function for the first and second processor architectures, respectively. The virtual address to physical address translation for each processor may enable the "correct" table 220, 222 to be mapped at the same virtual address.

For example, as shown in FIG. 2, the function table for Processor 1 may include addresses (e.g., virtual addresses) for first versions of the "OS schedule" function, the "OS read" function, and the "OS write" function. The function table for Processor 2 may include addresses (e.g., virtual addresses) for second versions of the "OS schedule" function, the "OS read" function, and the "OS write" function. A call to the function "OS schedule" in high-level code may point to the first entry of a table that is stored at a particular virtual address. As described with reference to the first embodiment above, from the perspective of the high-level code, the same virtual address is used for the function mapping table, regardless of which processor is executing the high-level code. When the high-level code is executed on Processor 1, the table 220 may be accessed and the resulting address of the "proc1" version of the "OS schedule" from the first entry of the table 220 may be used. That is, when the high-level code is executed on Processor 1, the table 220 may be "chosen" instead of the table 222, because, for Processor 1, the virtual address for the function mapping table in the high-level code maps (e.g., via a virtual-to-physical address mapping table specific to Processor 1) to the physical address of the table 220. When the high-level code is executed on Processor 2, the table 222 may be accessed, and the resulting address of the "proc2" version of the "OS schedule" function from the first entry of the table 220 may be used. That is, when the high-level code is executed on Processor 2, the table 222 may be "chosen" instead of the table 220, because, for Processor 2, the virtual address for the function mapping table in the high-level code maps (e.g., via a virtual-to-physical address mapping table specific to Processor 2) to the physical address of the table 222. Thus, the second embodiment is similar to a "global offset table" for position-independent code.

In a third embodiment (designated "Option 3" in FIG. 2), a single table 230 may include the addresses of the functions implemented in both the first and second processor instruction sets. Instead of storing the address to a function directly, data structures (e.g., used by high-level code) may contain the address or index in the table 230. Because a single table 230 is used instead of two different tables, the table 230 may be further indexed by the processor instruction set architecture. Thus, a lookup in the table 230 may specify both a function/table index/offset as well as an architecture (e.g., "proc1" or "proc2"). The table 230 may contain the address of the function for both the first and the second processor architectures, as shown. It will be appreciated that unlike the first and second embodiments described above, because a single table 230 is used, virtual address to physical address mappings may remain the same across processors in the third embodiment.

For example, as shown in FIG. 2, the function table may include addresses for versions of the "OS schedule" function, the "OS read" function, and the "OS write" in both the architecture of Processor 1 as well as in the architecture of Processor 2. A call to the function "OS schedule" in high-level code may point to the first entry of a table that is stored at a particular virtual address. When the high-level code is executed on Processor 1, a lookup on the table 230 may be performed, where the lookup specifies the offset for the "OS schedule" function and the "proc1" architecture, and the resulting address of the "proc1" version of the "OS schedule" may be used. When the high-level code is executed on Processor 2, a lookup on the table 230 may be performed, where the lookup specifies the offset for the "OS schedule" function and the "proc2" architecture, and the resulting address of the "proc2" version of the "OS schedule" function may be used.

It should be noted that in the second and third embodiments, a pointer to a function is never stored, but instead a table entry indication is stored and the address for the function is looked up every time at the call site.

During operation, a pointer in a data structure to a function may instead refer to the corresponding table entry. In Option 1, the entries in the table are instructions/instruction sequences, so the pointer can be called in the same manner that is done without the level of indirection introduced by the tables of FIG. 2. For Option 2 and Option 3, the table may be read and then the "correct" function address for the specific processor may be available (e.g., for use in a subsequent branch or jump).

It should be noted that the options described with reference to FIG. 2 may be combined. For example, multiple embodiments illustrated in FIG. 2 may be implemented simultaneously in a system (e.g., the system 100 of FIG. 1). To illustrate, the "procedure linkage tables" embodiment described with reference to the tables 210 and 212 may be used in conjunction with the "global offset tables" embodiment described with reference to the tables 220 and 222. When a function is called in high-level code for the first time on Processor 1, the call may resolve to a segment of code in the table 210, where the segment of code branches to the appropriate version of the function and also adds the destination of the branch to the table 220. Subsequent high-level calls to the function result in the branch instruction of the table 210 using the address in the table 220 as a destination. Additionally, it should be noted that other structures or procedures that serve the purpose of translating a function indication in a data structure to the address of the correct function for a given instruction set may be used.

Figure 3:
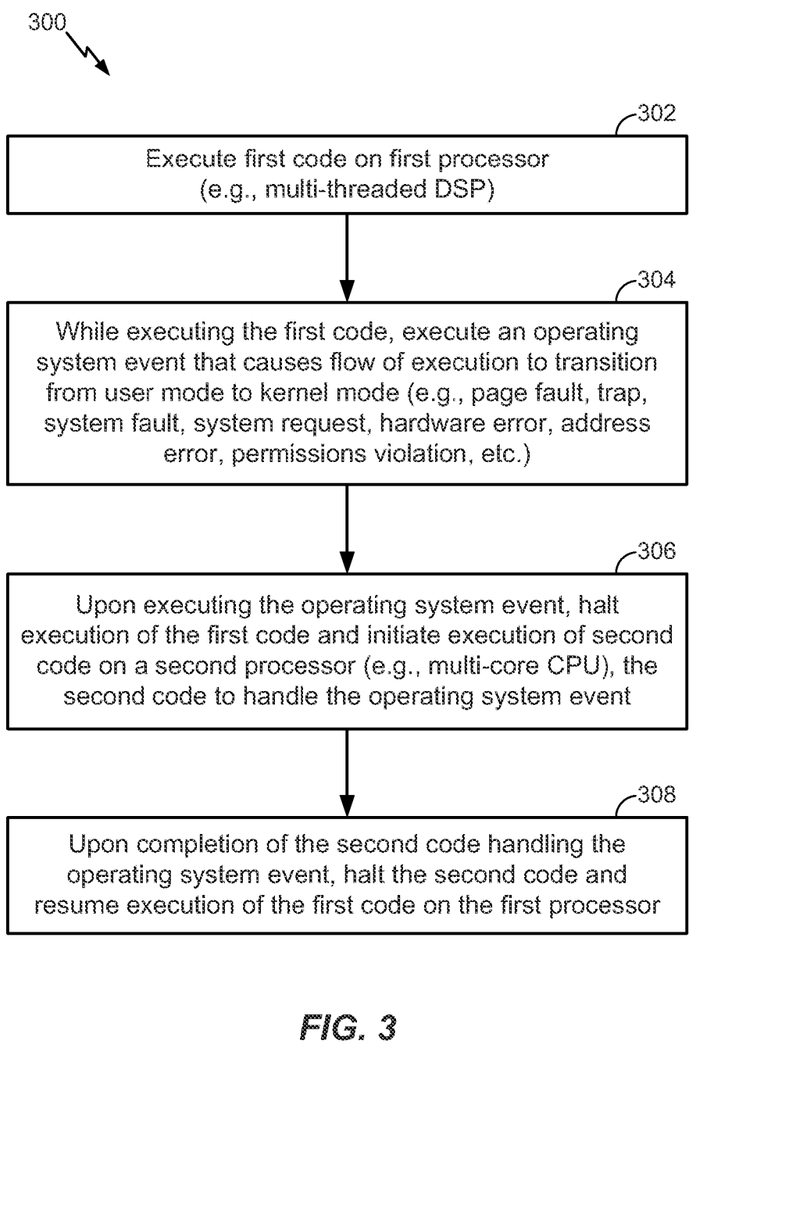
FIG. 3 is a flowchart to illustrate a particular embodiment of a method of executing a single instance of an operating system on multiple processors having different architectures.

FIG. 3 is a flowchart to illustrate a particular embodiment of a method 300 of executing a single instance of an operating system on multiple processors having different architectures. In an illustrative embodiment, the method 300 may be performed by the system 100 of FIG. 1 and may be described with reference to the functions and tables of FIG. 2.

The method 300 may include executing first code on a first processor, at 302. In a particular embodiment, the first processor may be a multi-threaded DSP. For example, the first processor 110 of FIG. 1 may execute first code corresponding to a first task, such as the "OS schedule," "OS read," or "OS write" function of FIG. 2.

The method 300 may also include, while executing the first code, executing an operating system event that causes flow of execution to transition from user mode to kernel mode, at 304. The operating system event may be a page fault, a trap, a system fault, a system request, a hardware error, an address error, a permissions violation, etc. For example, while executing the first code, the first processor 110 of FIG. 1 may execute an operating system event.

The method 300 may further include, upon executing the operating system event, halting execution of the first code and initiating execution of second code on a second processor, at 306. The second code may be configured to handle the operating system event. The second processor may be a multi-core CPU. For example, upon executing the operating system event, the first processor 110 of FIG. 1 may halt execution of the first code and may cause execution of second code on the second processor 112 of FIG. 1.

The method 300 may include, upon completion of the second code handling the operating system event, halting the second code and resuming execution of the first code on the first processor, at 308. For example, execution of the second code may be halted at the second processor 112 of FIG. 1 and execution of the first code may be resumed at the first processor 110 of FIG. 1.

The method 300 of FIG. 3 may thus enable a "secondary" processor to execute a "remoted" operating system environment and rely on a "primary" processor to handle operating system events. For example, even though code may have been written and compiled for a CPU executing a particular operating system, the code may be executed on a DSP running the particular operating system in conjunction with the CPU, and the DSP may rely on the CPU for event handling and other operating system tasks. From the perspective of a process running on the DSP, facilities/services that would have been available if the process was running on the CPU may still be available.

In a particular embodiment, the method 300 of FIG. 3 may be implemented by a DSP, a CPU, a controller, a field-programmable gate array (FPGA) device, an application-specific integrated circuit (ASIC), another hardware device, a firmware device, or any combination thereof. As an example, the method 300 of FIG. 3 can be performed by a processor that executes instructions, as described with respect to FIG. 5.

Figure 4:
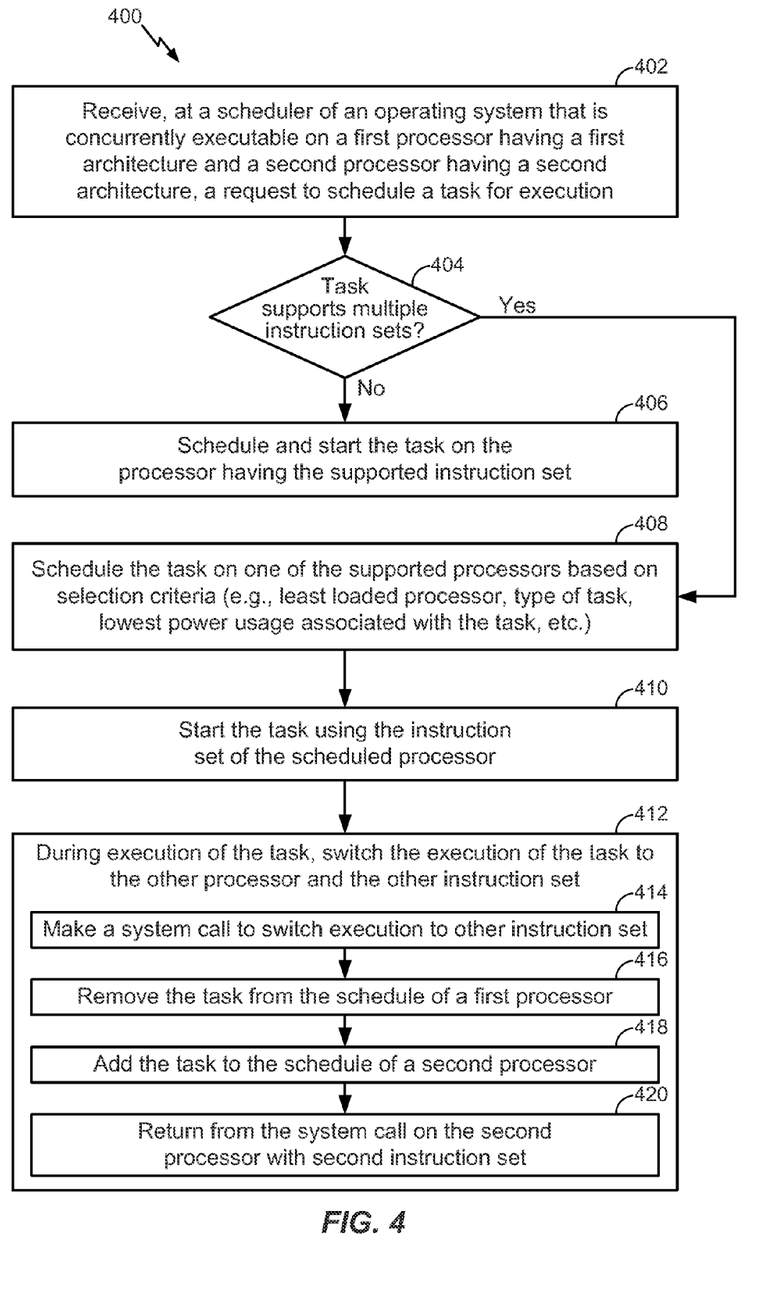
FIG. 4 is a flowchart to illustrate another particular embodiment of a method of executing a single instance of an operating system on multiple processors having different architectures.

FIG. 4 is a flowchart to illustrate another particular embodiment of a method 400 of executing a single instance of an operating system on multiple processors having different architectures. In an illustrative embodiment, the method 400 may be performed by the system 100 of FIG. 1 and may be described with reference to the functions and tables of FIG. 2.

The method 400 may include receiving, at a scheduler of an operating system, a request to schedule a task for execution, at 402. The operating system is concurrently executable on a first processor having a first architecture and a second processor having a second architecture. For example, in FIG. 1, the scheduler 106 may receive a request to schedule the task 114 for execution.

The method 400 may also include determining whether the task supports multiple instruction sets, at 404. For example, in FIG. 1, the scheduler 106 may determine whether the task 114 supports both the first instruction set of the first processor 110 and the second instruction set of the second processor 112. When the task supports a single instruction set, the method 400 may include scheduling and starting the task on a processor having the supported instruction set, at 406.

When the task supports multiple instruction sets, the method 400 may include scheduling the task on one of the supported processors, at 408, and starting the task using the instruction set of the scheduled processor, at 410. The scheduled processor may be selected based on selection criteria (e.g., a least loaded processor, a type of the task, a lowest power usage associated with the task, etc.). For example, in FIG. 1, the scheduler 106 may schedule the task 114 for execution on the first processor 110 based on the selection criteria 108 and may generate a system call to start the task 114 using the first instruction set.

The method 400 may also include, during execution of the task, switching the execution of the task to the other processor and to the other instruction set, at 412. For example, in FIG. 1, during execution of the task 114 on the first processor 110, execution of the task 114 may be switched to the second processor 112, as shown at 120.

In an illustrative embodiment, switching execution of the task may include making a system call on the first processor to switch execution of the task to the other instruction set, at 414. Proceeding to 416, the task may be removed from the schedule of a first processor (i.e., the scheduled processor used at 410). Advancing to 418, the task may be added to the schedule of a second processor (i.e., the other processor associated with the other instruction set). Continuing to 420, the method 400 may include returning from the system call on the second processor with the second instruction set.

The method 400 of FIG. 4 may thus enable dynamic scheduling of tasks at multi-ISA systems in accordance with selection criteria that may improve execution performance, resource usage, and/or power consumption at such systems.

In a particular embodiment, the method 400 of FIG. 4 may be implemented by a DSP, a CPU, a controller, a field-programmable gate array (FPGA) device, an application-specific integrated circuit (ASIC), another hardware device, a firmware device, or any combination thereof. As an example, the method 400 of FIG. 4 can be performed by a processor that executes instructions, as described with respect to FIG. 5.

Figure 5:
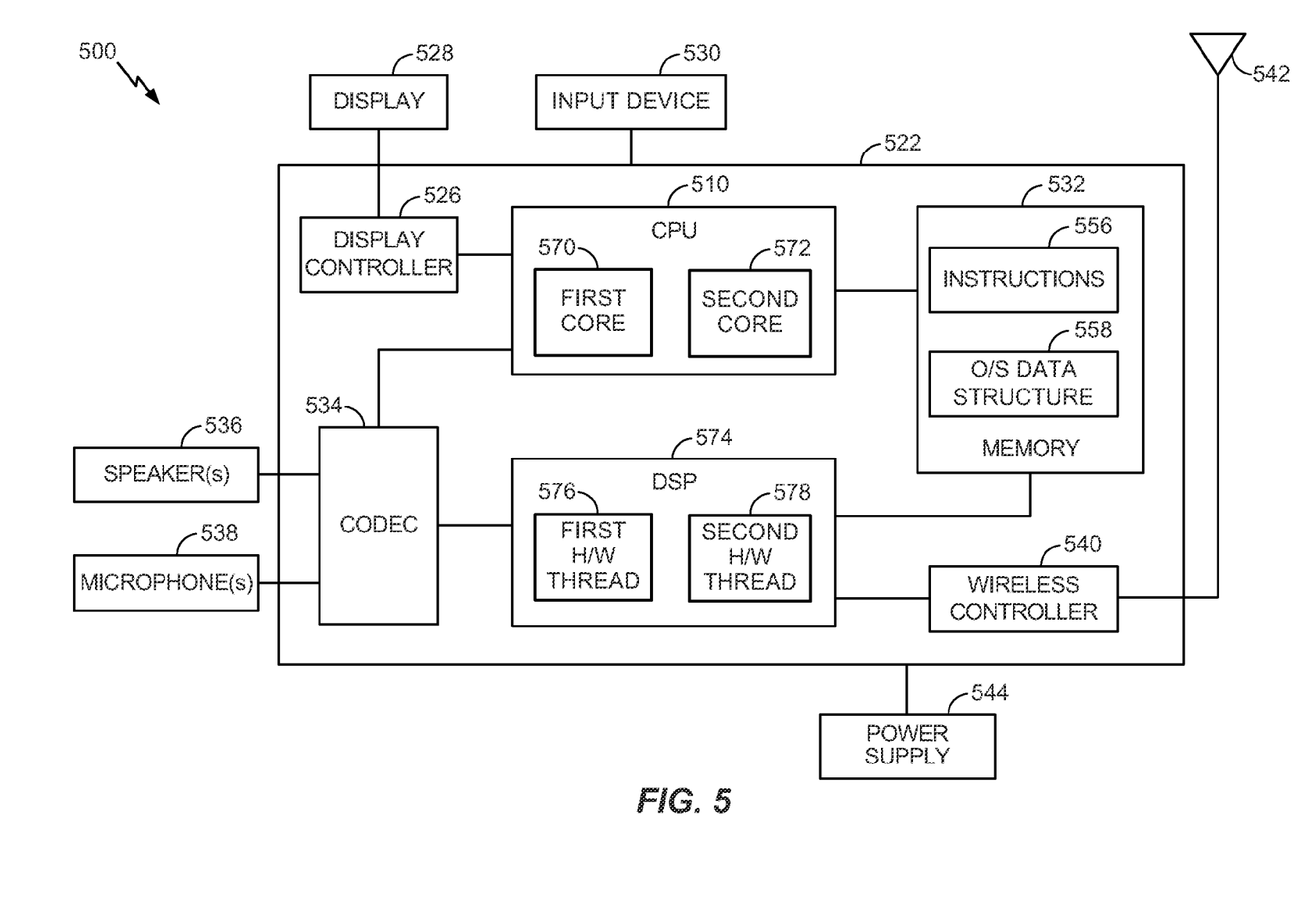
FIG. 5 is a block diagram of a wireless device including components operable to support execution of a single instance of an operating system on multiple processors having different architectures.

Referring to FIG. 5, a block diagram of an electronic device 500 is shown. In a particular embodiment, the electronic device 500, or components thereof, may be included in a set top box, a music player, a video player, an entertainment unit, a navigation device, a communications device, a personal digital assistant (PDA), a fixed location data unit, a computing device, or any combination thereof.

The electronic device 500 includes a CPU 510 and a DSP 574 coupled to a memory 532. The CPU 510 may include multiple cores (e.g., a first core 570 and a second core 572) and the DSP 574 may include multiple hardware threads (e.g., a first hardware thread 576 and a second hardware thread 578). Although two cores and two hardware threads are shown in FIG. 5, it should be noted that other configurations having a different number of cores and/or hardware threads may also be used.

FIG. 5 includes a display controller 526 that is coupled to the CPU 510 and to a display 528. A coder/decoder (CODEC) 534 may be coupled to the CPU 510 and to the DSP 574. A speaker 536 and a microphone 538 can be coupled to the CODEC 534. FIG. 5 also indicates that a wireless controller 540 can be coupled to the DSP 574 and to an antenna 542 (e.g., via a radio frequency (RF) interface). Thus, in the embodiment of FIG. 5, the CPU 510 may be used to perform display functions, the DSP 574 may be used to perform wireless signal processing functions, and both the CPU 510 and the DSP 574 may be capable of performing audio I/O functions.

The memory 532 may be a tangible non-transitory computer-readable or processor-readable storage medium that includes executable instructions 556. For example, the memory 532 may store at least a portion of the operating system 104 of FIG. 1 and/or components thereof, such as the scheduler 106 of FIG. 1, the event handler 107 of FIG. 1, and the selection criteria 108 of FIG. 1. When the memory 532 (e.g., RAM) stores a portion of the operating system, a remainder of the operating system may be stored in another memory or storage device (e.g., hard disk(s)). The memory 532 may also store an operating system data structure 558 (e.g., the operating system data structure 118 of FIG. 1 and/or the tables of FIG. 2). The instructions 556 may be executed by a processor, such as the CPU 510 or the DSP 574, to perform various functions and methods, including the methods 300 and 400 of FIGS. 3 and 4.

In a particular embodiment, the CPU 510, the DSP 574, the display controller 526, the memory 532, the CODEC 534, and the wireless controller 540 are included in a system-in-package or system-on-chip device 522. In a particular embodiment, an input device 530 and a power supply 544 are coupled to the system-on-chip device 522. Moreover, in a particular embodiment, as illustrated in FIG. 5, the display 528, the input device 530, the speaker 536, the microphone 538, the antenna 542, and the power supply 544 are external to the system-on-chip device 522. However, each of the display 528, the input device 530, the speaker 536, the microphone 538, the antenna 542, and the power supply 544 can be coupled to a component of the system-on-chip device 522, such as an interface or a controller.

In conjunction with the described embodiments, an apparatus includes first means for processing instructions associated with a first instruction set. For example, the first means for processing may include the first processor 110 of FIG. 1, the second processor 112 of FIG. 1, the CPU 510 of FIG. 5, the DSP 574 of FIG. 5, another processor (e.g., a NPU or a GPU), another device or module configured to process instructions, or any combination thereof.

The apparatus may also include second means for processing instructions associated with a second instruction set. For example, the second means for processing may include the first processor 110 of FIG. 1, the second processor 112 of FIG. 1, the CPU 510 of FIG. 5, the DSP 574 of FIG. 5, another processor (e.g., a NPU or a GPU), another device or module configured to process instructions, or any combination thereof.

The apparatus may further include means for storing at least a portion of an operating system, the operating system concurrently executable on the first means for processing and the second means for processing. For example, the means for storing at least a portion of the operating system may include the coherent memory 116 of FIG. 1, the memory 532 of FIG. 5, another device or module configured to store data, or any combination thereof.

The apparatus may also include means for storing at least one shared data structure associated with the operating system. For example, the means for storing the at least one shared data structure may include the memory 116 of FIG. 1, the memory 532 of FIG. 5, another device or module configured to store data, or any combination thereof.

The apparatus may include means for scheduling execution of a task that supports both the first instruction set and the second instruction set on either of the first means for processing or the second means for processing. For example, the means for scheduling may include the scheduler 106 of FIG. 1, another device or module configured to schedule tasks for execution, or any combination thereof.

Those of skill would further appreciate that the logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), a digital versatile disc (DVD), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

For example, in accordance with the described embodiments, a non-transitory computer-readable storage medium (e.g., a CD, a DVD, a memory device, etc.) may store a single instance of an operating system. The operating system may include instructions that, when executed at an electronic device including a first processor and a second processor, cause concurrent execution of the operating system on the first processor and the second processor. The first processor is associated with a first instruction set architecture and the second processor is associated with a second instruction set architecture that is different than the first instruction set architecture.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
   a first processor associated with a first instruction set architecture, the first processor configured to access a first table entry of a function table stored at a virtual address of a shared data structure;
   a second processor associated with a second instruction set architecture, the second instruction set architecture being different than the first instruction set architecture, the second processor configured to access a second table entry of the function table stored at the virtual address of the shared data structure;
   a memory storing at least a portion of an operating system configured to be concurrently executable on the first processor and the second processor; and
   a scheduler configured to schedule execution of a task of the operating system on the first processor using first instructions of a first instruction set and to schedule execution of the task on the second processor using second instructions of a different instruction set, the first processor configured to access the first instructions based on the first table entry of the function table and the second processor configured to access the second instructions based on the second table entry of the function table.

2. The apparatus of claim 1, wherein:
   the first table entry and the second table entry are different; and
   the first processor and the second processor are integrated into a mobile computing device.

3. The apparatus of claim 1, wherein the memory includes the function table, and wherein the first table entry and the second table entry correspond respectively to a first location identifier and a second location identifier in the function table.

4. The apparatus of claim 3, wherein:
   the first location identifier identifies a location of a first version of the task that is represented using the first instruction set and that is associated with a first address; and
   the second location identifier identifies a location of a second version of the task that is represented using the second instruction set and that is associated with a second address different than the first address.

5. The apparatus of claim 3, wherein the function table comprises:
   a first function table that is accessible to the first processor and that stores the first location identifier, wherein the first location identifier comprises a first jump or branch instruction to a first address; and
   a second function table that is accessible to the second processor and that stores the second location identifier, wherein the second location identifier comprises a second jump or branch instruction to a second address different than the first address,
   wherein the first function table and the second function table are associated with different physical addresses.

6. The apparatus of claim 3, wherein the function table comprises:
   a first function table that is accessible to the first processor and that stores the first location identifier, wherein the first location identifier comprises a first address; and
   a second function table that is accessible to the second processor and that stores the second location identifier, wherein the second location identifier comprises a second address different than the first address,
   wherein the first function table and the second function table are associated with different physical addresses.

7. The apparatus of claim 1, wherein:
   the first table entry in the shared data structure comprises a first address associated with a first version of the task that is represented using the first instruction set;
   the second table entry in the shared data structure comprises a second address associated with a second version of the task that is represented using the second instruction set; and
   the shared data structure comprises one or more function tables indexed at least partially based on a particular instruction set.

8. The apparatus of claim 1, wherein the operating system includes the scheduler, the scheduler configured to schedule execution of tasks for completion by the first processor, the second processor, or both.

9. The apparatus of claim 1, wherein the scheduler is configured to schedule execution of the task for completion by the first processor, the second processor, or both.

10. The apparatus of claim 1, wherein the scheduler is configured to select the first processor or the second processor to execute the task based on an identification of a lowest power usage associated with the task.

11. The apparatus of claim 1, wherein the scheduler selects the first processor or the second processor to execute the task based on a selection criteria that includes identification of a least loaded processor, a type of the task, identification of a lowest power usage associated with the particular task, or any combination thereof.

12. The apparatus of claim 1, further comprising:
   a wireless controller coupled to the first processor; and
   an antenna coupled via the wireless controller to the first processor, wherein the operating system is configured to provide a system call to start one or more tasks using a specified instruction set.

13. The apparatus of claim 1, wherein the operating system is configured to provide a system call to switch ongoing execution of a particular task using a particular instruction set to a different instruction set.

14. A method comprising:
   receiving, at a scheduler of an operating system that is concurrently executable on a first processor having a first instruction set architecture and a second processor having a second, different instruction set architecture, a request to schedule a task for execution, the first processor configured to access a first table entry of a function table stored at a virtual address of a shared data structure, and the second processor configured to access a second table entry of the function table stored at the virtual address of the shared data structure;

in response to determining that the task is available for execution using first instructions of a first instruction set on the first processor and using second instructions of a different instruction set on the second processor, scheduling the task on the first processor based on at least one selection criterion, the first processor configured to access the first instructions based on the first table entry of the function table and the second processor configured to access the second instructions based on the second table entry of the function table; and during execution of the task, switching execution of the task from the first processor to the second processor.

15. The method of claim 14, further comprising:
in response to scheduling the task on the first processor, executing first code on the first processor;
while executing the first code, executing an operating system event;
upon executing the operating system event, halting execution of the first code and initiating execution of second code on the second processor, the second code to handle the operating system event; and
upon completion of execution of the second code handling the operating system event, halting the second code and resuming execution of the first code on the first processor.

16. The method of claim 14, wherein:
the first table entry and the second table entry correspond respectively to a first location identifier and a second location identifier in the shared data structure, and wherein the first location identifier and the second location identifier are different.

17. The method of claim 14, wherein the first processor and the second processor are each configured to access the same coherent memory, the coherent memory comprising the shared data structure, and wherein the first processor and the second processor are integrated into a mobile computing device.

18. The method of claim 15, wherein the function table comprises:
a first function table corresponding to a first version of the task compiled to execute on the first processor, the first version of the task represented using the first code, and
a second function table corresponding to a second version of the task compiled to execute on the second processor, the second version of the task represented using the second code.

19. The method of claim 14, wherein the first processor and the second processor are configured to communicate with each other via inter-processor messaging, a shared memory, an application programming interface (API), or any combination thereof.

20. The method of claim 14, wherein the first processor comprises a digital signal processor (DSP) having multiple hardware threads, and wherein the second processor comprises a multi-core central processing unit (CPU).

21. The method of claim 15, wherein the operating system event comprises a page fault, a trap, a system fault, a system request, a hardware error, an address error, a permissions violation, or any combination thereof.

22. The method of claim 15, wherein the operating system event causes flow of execution to transition from a user mode of the operating system to a kernel mode of the operating system.

23. The method of claim 14, wherein the at least one selection criterion comprises a lowest power use associated with the task.

24. The method of claim 14, wherein the at least one selection criterion comprises a least loaded processor, a type of the task, a lowest power use associated with the task, or any combination thereof, and wherein switching execution of the task comprises:
initiating a system call from the first processor;
removing the task from a schedule of the first processor;
adding the task to a schedule of the second processor; and
returning from the system call on the second processor.

25. An apparatus comprising:
first means for processing instructions associated with a first instruction set architecture, the first means for processing instructions configured to access a first table entry of a function table stored at a virtual address of a shared data structure;
second means for processing instructions associated with a second instruction set architecture that is different than the first instruction set architecture, the second means for processing instructions configured to access a second table entry of the function table stored at the virtual address of the shared data structure;
means for storing at least a portion of an operating system, the operating system concurrently executable on the first means for processing and the second means for processing, the means for storing comprising the shared data structure; and
means for scheduling execution of a task of the operating system on the first means for processing using first instructions of a first instruction set and scheduling execution of the task on the second means for processing using second instructions of a different instruction set, the first means for processing configured to access the first instructions based on the first table entry of the function table and the second means for processing configured to access the second instructions based on the second table entry of the function table.

26. The apparatus of claim 25, wherein the means for scheduling execution is configured to schedule the execution of the task based on an identification of a lowest power usage associated with the task, wherein the task supports both the first instruction set and the second instruction set on either of the first means for processing or the second means for processing.

27. The apparatus of claim 25, wherein the task is executed using both the first instruction set and the second instruction set on either of the first means for processing or the second means for processing, wherein the first means for processing and the second means for processing are integrated into a mobile computing device.

28. A non-transitory computer-readable medium comprising:
a single instance of an operating system, wherein the single instance of the operating system comprises instructions that, when executed at an electronic device comprising a first processor and a second processor, cause concurrent execution of the operating system on the first processor and the second processor, the first processor associated with a first instruction set architecture and the second processor associated with a second instruction set architecture that is different from the first instruction set architecture; and a scheduler configured to schedule execution of a task of the operating system on the first processor using first instructions of a first instruction set and to schedule execution of the task on the second processor using second instructions of a different instruction set, the first processor configured to access the first instructions based on a first table entry of a function table stored at a virtual address of a shared data structure, and the second processor configured to access the second instructions based on a second table entry of the function table stored at the virtual address of the shared data structure.

29. An apparatus comprising:

a shared memory accessible to a first processor that is associated with a first instruction set architecture and to a second processor that is associated with a second, different instruction set architecture, wherein the shared memory stores one or more function tables, the one or more function tables including:
- a first location identifier of a task of the operating system compiled to execute on the first instruction set architecture, wherein the first location identifier is accessible to the first processor at a virtual address of the shared memory;
- a second location identifier of the task compiled to execute on the second instruction set architecture, wherein the second location identifier is accessible to the second processor at the virtual address of the shared memory; and a scheduler configured to schedule execution of the task on the first processor using first instructions of a first instruction set and to schedule execution of the task on the second processor using second instructions of a different instruction set, the first processor configured to access the first instructions based on the first location identifier and the second processor configured to access the second instructions based on the second location identifier.

30. The apparatus of claim 29, wherein the one or more function tables comprises:
- a first table that is accessible to the first processor and that stores a first jump or branch instruction to a first address of the task; and
- a second table that is accessible to the second processor and that stores a second jump or branch instruction to a second address of the task, wherein the first address is different from the second address, and wherein the first table and the second table are associated with different physical addresses.

31. The apparatus of claim 29, wherein the one or more function tables comprises:
- a first function table that is accessible to the first processor and that stores a first jump or branch instruction to a first address of the task; and
- a second function table that is accessible to the second processor and that stores a second jump or branch instruction to a second address of the task, wherein the first address is different from the second address, and wherein the first function table and the second function table are associated with different physical addresses.

32. The apparatus of claim 29, wherein the first processor, the second processor, and the memory are integrated into a mobile computing device, wherein the one or more function tables stores a first address associated with the first instructions and a second address associated with the second instructions, wherein the one or more function tables is indexed at least partially based on a third instruction set, and wherein the first address is different from the second address.

* * * * *